United States Patent [19]

Kimmel et al.

[11] 4,454,428

[45] Jun. 12, 1984

[54] NOISE REDUCTION MEANS FOR A DYNAMIC STABILIZER FOR SYNCHRONOUS MACHINES HAVING TORSIONAL OSCILLATIONS AND METHOD

[75] Inventors: Donald S. Kimmel, Monroeville; William H. South, McKeesport, both of Pa.

[73] Assignee: Westinghouse Electric Corp., Pittsburgh, Pa.

[21] Appl. No.: 285,886

[22] Filed: Jul. 22, 1981

[51] Int. Cl.³ .......................... H02P 9/04; H02H 7/06
[52] U.S. Cl. .................................. 290/40 R; 322/25; 322/58
[58] Field of Search .................. 290/40 R; 322/25, 29, 322/32, 58

[56] References Cited

U.S. PATENT DOCUMENTS

| | | | |
|---|---|---|---|
| 2,767,367 | 10/1956 | Black | 322/32 |
| 2,854,617 | 9/1958 | Johnson | 322/20 X |
| 3,119,934 | 1/1964 | Lee | 322/20 X |
| 3,167,702 | 1/1965 | Schonung et al. | 322/19 X |
| 3,474,323 | 10/1969 | Kilgore et al. | 322/25 X |
| 3,999,115 | 12/1976 | South et al. | 322/25 |
| 4,039,846 | 8/1977 | Vance | 290/40 R |
| 4,080,559 | 3/1978 | Wright et al. | 322/25 X |
| 4,114,084 | 9/1978 | Glaudel et al. | 322/25 X |
| 4,125,884 | 11/1978 | Sun | 322/58 X |
| 4,229,689 | 10/1980 | Nickoladze | 322/32 |
| 4,303,882 | 12/1981 | Wolfinger | 322/25 X |
| 4,311,253 | 1/1982 | Putnam et al. | 322/29 X |
| 4,329,637 | 5/1982 | Kotake et al. | 322/58 X |
| 4,344,027 | 8/1982 | Karlicek | 322/32 X |
| 4,377,780 | 3/1983 | Bjorklund | 322/29 |

Primary Examiner—J. V. Truhe
Assistant Examiner—Terry Flower
Attorney, Agent, or Firm—M. J. Moran

[57] ABSTRACT

Signal conditioning apparatus for reducing the noise frequencies of a speed sensing means signal being fed into a compensating means for compensating the output of a synchronous generator for the effect of torsional oscillation between masses in the main AC generator system. The signal conditioning apparatus includes two speed sensing transducers mounted 180° apart on opposite sides of a tooth gear wheel and summing the two FM output signals from the transducers to eliminate odd harmonics of the synchronous frequency in FM noise due to eccentricity. The preferred embodiment of the invention reduces the remaining noise from the sensed speed signal by the use of a three-pole Butterworth low-pass filter in combination with a notch filter tuned to the turbine-generator synchronous frequency to thereby reduce the unwanted noise to a large degree while providing a minimal phase shift to the sensed speed signal. Another embodiment of the invention may be used to determine the machining accuracy of the toothed gear wheel.

3 Claims, 4 Drawing Figures

NOISE REDUCTION MEANS FOR A DYNAMIC STABILIZER FOR SYNCHRONOUS MACHINES HAVING TORSIONAL OSCILLATIONS AND METHOD

BACKGROUND OF THE INVENTION

1. Field of the Invention:

The invention relates in general to feedback control for turbine-driven high-powered AC synchronous generator systems and in particular a means and method for reducing the noise generated in the means for sensing torsional oscillation in the mechanical portion of the power generating system.

2. Description of the Prior Art:

In long line electrical transmission systems of the type where the electrical generators are driven from power sources such as steam turbines, multiple rotating masses may be present on a single shaft, such as, the rotating mass of one or more turbines and the rotating mass of an exciter upon AC generator as well as the rotating mass of the generator rotor. Because of the mechanical properties of the various parts of the rotating system, torsional oscillation may be possible between any combination of masses. It has been found in certain applications that such undamped torsional oscillations may exist because of the electrical properties of the AC synchronous generator electrical system. The inductive effect of the long transmission lines may require a series capacitive compensation and the effect of the compensating capacitors being connected in series circuit relationship with the inductance of the long transmission lines tends to cause certain resonant frequencies to exist in the output electrical circuit of the AC generator. These resonant frequencies may be reflected by the magnetic coupling between the stator and rotor of the synchronous generator to the mechanically rotating shaft. Should these electrical resonant frequencies coincide with a critical mechanical resonant frequency between any of the masses of the generating system, reinforced undamped oscillation may occur which may be of sufficient magnitude to break the shaft. Apparatus and method for solving this problem have been proposed in U.S. Pat.No. 3,999,115 entitled "Dynamic Stabilizer For Synchronous Machines Having Torsional Oscillations And Method," issued on Dec. 21, 1976 to William H. South and assigned to the same assignee as the present invention. This patent teaches method and apparatus that sense torsional oscillation and quickly operate on the output power of the synchronous generator to thus provide compensation. The torsional oscillation is sensed by a speed sensing or tachometer means which is provided to sense and measure the speed of the rotating shaft in a turbine generator system of the type previously described and provide a signal related thereto. This signal then is provided to a compensating means for compensating for the modulation of the electrical output power by the torsional oscillation within the generator system. One of the problems involved with this arrangement for providing compensation to the output power of the synchronous generator is that the sensing means used to sense the speed of the rotating shaft is subject to several sources of error which can cause a velocity deviation signal (noise). That is, the extracted signal can indicate that a velocity deviation exists on the shaft, when in fact, the generator system is rotating at synchronous speed with no outside torsional disturbances. The velocity deviation signal (noise) may be equal or even exceed the signal due to the torsional oscillation of the shaft. Attempts to filter out the undesirable noise signals from the sensing means signal may add a phase shift delay to the output signal from the sensing means which phase shift is undesirable since either an active or passive compensating means must provide an output that is 180° phase shifted from the synchronous generator to thus provide compensation. It would be advantageous if a method and apparatus could be found which would reduce the unwanted noise in the output of the sensing means signal to a large degree while providing a minimal phase shift to that portion of the sensing means signal which is passed through to the compensating means.

One speed sensing means includes a variable reluctance electromagnetic transducer which is mounted close to a multiple toothed machined tooth gear wheel. One of the problems associated with the machining of tooth gear wheels is to determine the tooth to tooth distances and the tooth widths of the gear after the machining process. The present method utilizes a mechanical system which measures the amount of pressure with "master" gear with known accuracies, i.e. errors in runout, tooth width, etc., and the chart recorder must be synchronized to the master gear. However this system is subject to the same errors associated with any mechanical means. In addition, the same master gear must be available at all times to insure repeatable measuring results. Accordingly it would be desirable if an electromechanical means could determine the machining accuracy of a tooth gear wheel since this would not be subject to the disadvantages of the mechanical system currently used.

SUMMARY OF THE INVENTION

In accordance with the invention a sensor is provided to sense and measure the speed on a rotating shaft in a generator system of the type previously described and provide a signal related thereto. The speed is a measure of the torsional oscillation, as the variation in shaft rotational speed will reflect torsional oscillation. The output signal from the sensor is subject to several sources of error which can cause a velocity deviation signal (noise). That is, the extracted signal may indicate that a velocity deviation exists on the shaft, when in fact, the turbine generator system is rotating at synchronous speed with no outside torsional disturbances. Before being fed into a compensating means for compensating the output of the synchronous generator for the effect of the torsional oscillation, the sensing or tachometer means signal is fed to a signal conditioning means for filtering the noise frequencies of the sensing means signal while passing the frequencies of the sensing means signal indicative of the torsional oscillation to the compensating means. The signal conditioning means may include a multiple pole Butterworth low-pass filter. In a preferred embodiment the filtering means includes a three-pole Butterworth low-pass filter in series with a 60 Hz notch filter so as to reduce the unwanted noise portion of the signal to a minimum while providing a minimal phase shift to that portion of the signal indicative of the torsional oscillation. In one embodiment of the invention the sensing means includes a machined toothed wheel mounted on a shaft coupling the exciter and the generator and first and second variable reluctance electromagnetic transducers which are mounted in 180° opposing relationship to the multiple toothed, precision-machined steel wheel mounted on the exciter-generator shaft. The output from the first and second transducers are fed into a summing amplifier of the signal conditioning means. By summing the output of the first and second transducers the noise portion of the tachometer means signal due to the toothed-wheel eccentricity is eliminated.

One embodiment of the invention may be used to determine the machining accuracy of the machined tooth gear wheel. In this embodiment of the invention the tooth gear wheel to be inspected is mounted on a driving means for driving the tooth gear wheel at a constant frequency and sensing means is located adjacent to the tooth gear wheel for sensing the frequency of rotation of the gear teeth. If any frequency is sensed that is not a direct multiple of the constant or synchronous frequency of the motor, it must be due to machining error on the toothed wheel, that is the only variation in the frequency of the single signal produced by the sensing means will be that which is caused by tooth to tooth variations on the gear.

BRIEF DESCRIPTION OF THE DRAWINGS

The invention may be understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 1:
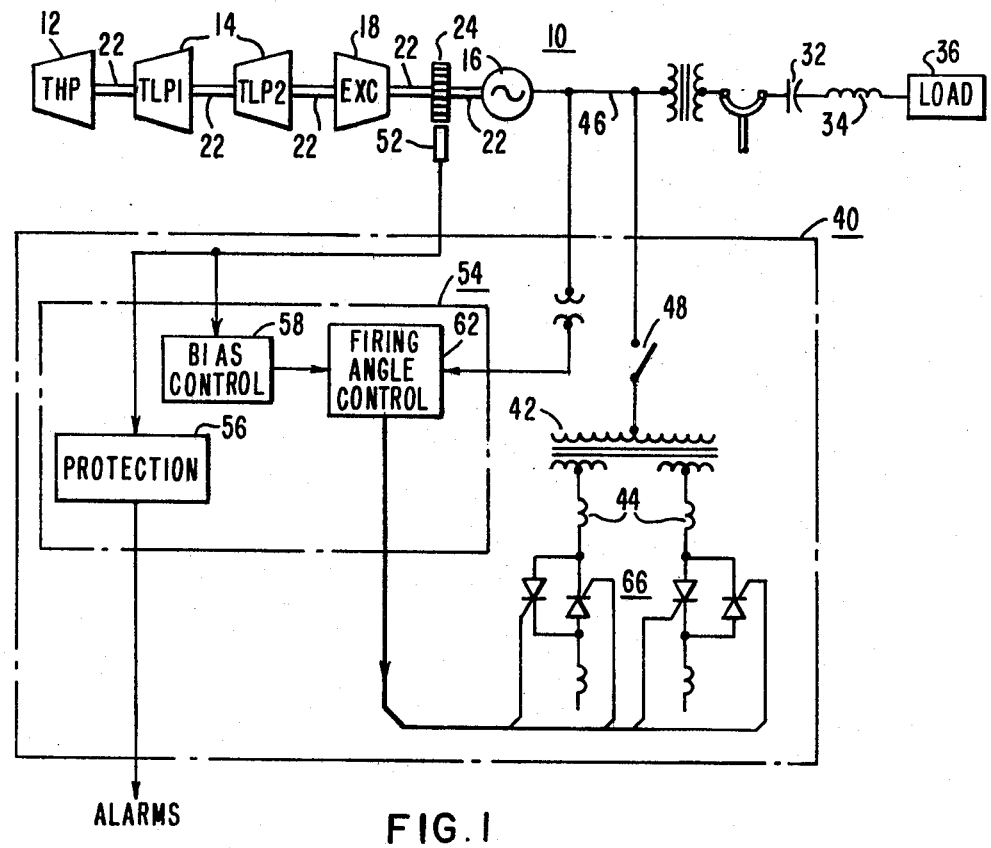
FIG. 1 is a torsional dynamic stabilizer block diagram with a synchronous generator system including the mechanical and electrical portions thereof.
Figure 4:
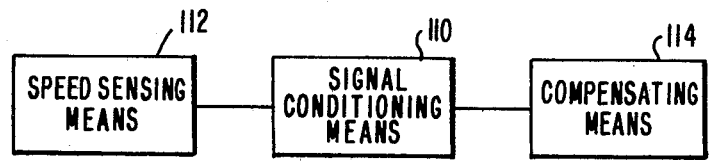
FIG. 4 is an elementary block diagram of the signal conditioning system according to the teachings of the invention.

Referring now to the drawings and FIG. 1 in particular a block diagram of the torsional dynamic stabilizer on an electrical generating system 10 that may be subject to subsynchronous resonance oscillations is shown. The turbine generator electrical generating system 10 consists of a high-pressure turbine 12 followed by two low-pressure turbine stages 14 coupled to a synchronous generator 16 and exciter 18 through a common shaft 22. A machined toothed wheel 24 is mounted on the shaft coupling the exciter and the generator. With regard to the elements of FIG. 1 certain things have been discovered. It has been found that there is a possibility for multiple inertias to exist on a single shaft of a turbine generator system because of the mechanical properties of the rotating masses and the shaft which interconnects them. Typical rotating masses may comprise the rotating parts of turbines, the rotor of an exciter for an electrical generator and rotor of the generator. The masses are not limited to these kinds and types. The turbines may be of the low-pressure type and/or the high-pressure type and may be of the steam, gas and/or water-type or any other suitable type. Natural mechanical resonant frequencies may exist among any and all of these masses. The total number of natural frequencies available is approximately equal to the total number of mass-spring sets, where a mass-spring set is defined as any two masses interconnected by a shaft. Some common natural frequencies for steam turbine generator systems have been found to be 15 Hz, 23 Hz, and 28 Hz. It has been found that if the electrical load power for the generator varies or oscillates, it may be induced back into the mechanical portion of the system where the resonant frequencies of the mechanical portion of the system may lead to shaft breakage. It has been found that the series capacitors shown generally at 32 in conjunction with the line inductances shown generally at 34 for long line transmission systems can cause oscillations or can resonant at certain electrical frequencies which are a function of the capacitance and inductance of the lines. The series capacitors are necessary for compensation for the voltage drop, or part of the drop, due to the inductive reactance of the long line. It has been found that the mechanical torque produced by the electrical resonant frequency will itself have a frequency of 60 Hz plus and minus the electrical resonant frequency. Consequently, if the electrical resonant frequency is 45 Hz, then the mechanical torque frequency related thereto are 15 Hz and 75 Hz. It has been found that in almost all cases the lower electrical resonant frequency may be the same as a critical mechanical resonant frequency of the turbine generator system. It has also been found that the electrical resonant frequency is almost always lower than 60 Hz because of the necessary choice of the capacitors for phase angle correction. It is not always to be presumed that 60 Hz is the frequency of the power generating system, 50 Hz may be the frequency in some cases and 25 Hz in other cases and, of course, none of these are limiting. However, for purposes of illustration and because of the predominance of the 60 Hz generating power it can be said that mechanical frequencies of 15 Hz, 23 Hz and 28 Hz which correspond to electrical frequencies of 45 Hz, 37 Hz and 32 Hz are common frequencies to be avoided in steam turbine generator systems because of the potential damage that may occur if the shafts are caused to oscillate at any one or all of the previously described mechanical frequencies.

A torsional dynamic stabilizer is a compensating means as disclosed in U.S. Pat. No. 3,999,115 for directly compensating for the effect of the torsional oscillations of the generator system output electrical power. Referring again now to FIG. 1 compensating means or torsional dynamic stabilizer 40 consists of a specially designed transformer 42 and two delta-connected sets of reactors 44, whose effective inductance is controlled by an input signal derived from a speed sensing means 38 for sensing the speed of the generator-exciter shaft 22. Speed sensing means 38 includes the machined toothed wheel 24 and at least one toothed wheel transducer 52 disposed in relationship to shaft 22 sufficient to measure the rotational velocity of shaft 22. Compensating means or torsional dynamic stabilizer 40 is connected to the generator iso-phase bus 46 by means of disconnect switch 48. Under subsynchronous resonant conditions as discussed above, any shaft velocity deviations at subsynchronous frequencies are extracted from the electrical signals provided by the toothed-wheel transducer 52. Compensating means or torsional dynamic stabilizer 40 is controlled by a control system shown generally at 54. Control system 54 includes a protection portion shown generally at 56 which may contain narrow band-pass filters tuned to the major subsynchonous resonance frequencies. When the output of one of these filters exceeds a preset limit beyond a specific time, shutdown signals are generated. In addition, current transformer signals fed into the protection portion of the system provide warning alarms, and eventually shutdown signals, in the event abnormal or excessive currents occur. Bias control portion shown generally at 58 of control system 54 normally provides a fixed output to the firing angle control portion shown generally at 62 to maintain, in reactor banks 44, a conduction angle of about 90° for zero angular velocity deviations. This arrangement enables the variable reactors 44 to respond instantaneously to small subsynchronous resonance disturbances. If the velocity deviations exceed a preset level, the bias point shifts to a conduction angle of about 135° to provide maximum damping capability for the reactors 44. Firing angle control portion 62 converts an analog DC voltage, linearly proportional to the desired current in the reactors, to thyristor firing pulses which are appropriately phase-angle delayed and timed in proper sequence. As mentioned earlier the power section of torsional dynamic stabilizer or compensating means 40 includes two delt-connected reactor banks 44, whose currents are controlled by the series-connected thyristor switches 66. Reactor banks 44 are connected to the generator iso-phase bus 46 via specially designed forked-wye to delta transformer 42. Potential transformers on the generator iso-phase bus 46 and current transformers in the reactor legs provide reference and control signals to the tortional dynamic stabilizer control system circuitry 54. Further detailed descriptions of the structure and operation of torsional dynamic stabilizers may be found in the above referred to U.S. Pat. No. 3,999,115.

A key ingredient in the control system of a torsional dynamic stabilizer is the extraction of a signal from the speed sensing means that is an accurate representation of the velocity deviation, or oscillatory change in velocity, of the generator-exciter-turbine shaft. In the arrangement of FIG. 1 speed sensing means 38 includes variable reluctance electromagnetic transducer 52 which is mounted close to multiple toothed precision-machined steel wheel 24 mounted on the exciter-generator shaft as previously described. The output signal from the speed sensor, or in this case the transducer 52, is a voltage whose wave form is quasi-sinusoidal and whose frequency is proportional to the instantaneous angular velocity of the shaft. However, this voltage is subject to several sources of error which can cause a velocity deviation signal (noise). That is, the extracted signal can indicate that a velocity deviation exists on the shaft, when in fact, the turbine generator system is rotating at synchronous speed with no outside torsional disturbances. The types of possible errors and their sources are:

1. Wheel eccentricity can cause amplitude modulation of the signal because the induced voltage is a function of the distance between the pole piece of the transducer and the wheel. Frequency modulation can occur if any portion of the eccentricity is lateral to the pole piece.

2. Electrostatic and electromagnetic interference from outside sources can be introduced in the wires running from the transducer to the control cabinets. This type of noise also causes amplitude modulation of the signal.

3. Vibration of the shroud or collar on which the transducer is mounted can cause either or both amplitude and frequency modulation of the signal depending on the spatial distribution of the vibration.

4. Machining inaccuracy in the toothed wheel such as indexing errors can cause the teeth to have different widths at various positions around the wheel and thus produce frequency modulation of the signal.

Figure 2:
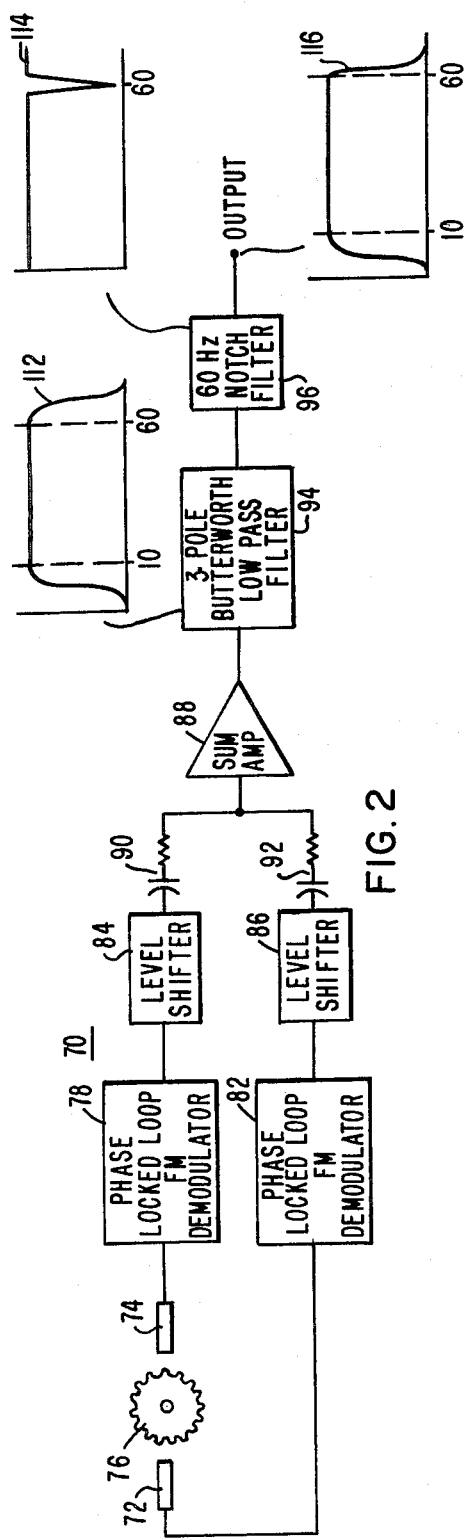
FIG. 2 is a signal conditioning system block diagram according to the teachings of the invention for use in reducing the unwanted noise portion of the speed or tachometer sensing means signal to a minimum while providing a minimal phase shift to that portion of the signal that is indicative of torsional oscillation within the synchronous generator system.

Referring now to FIG. 2 there is shown a block diagram of a signal conditioning system that greatly reduces the previously enumerated noise problems. Signal conditioning system 70 includes first and second transducers 72 and 74, respectively, which are mounted so as to be spaced 180° apart in opposing relationship on opposite sides of toothed wheel 76. The output signal from each transducer is connected to first and second phase-lock loop circuits 78 and 82, respectively, which serve as FM (frequency modulated) demodulators. The output signal from each FM demodulator or first and second phase-lock loop circuits 78 and 82, respectively, is then fed into first and second level shifters 84 and 86, respectively, where the output signals are then level-shifted so that each signal level is at zero volts (ground or common) for a zero or no velocity deviation. The signals are then added by summing amplifier 88 after passing through first and second single-pole high-pass filters 90 and 92, respectively. The summed signal is then fed into a three-pole active Butterworth maximally flat, low-pass filter 94 and then is fed to a notch filter 96 turned to the turbine-generator synchronous frequency which for our purposes of illustration is assumed to be 60 Hz. The output signal from the notch filter is a voltage proportional to the shaft velocity deviation over the subsynchronous frequency range of interest.

The use of two transducers such as first and second transducers 72 and 74, respectively, mounted 180° apart and summing the two FM channels helps to eliminate odd harmonics of the synchronous frequency and FM noise due to wheel eccentricity. However, the remaining noise sources disclosed above such as vibration and indexing errors in machining, are reduced by the use of band-pass filtering of the FM-detected velocity deviation signal. Since the toothed wheel is rotating at the turbine-generator synchronous frequency (60 Hz is under discussion) by and large the noise sources produce signals having frequencies that are multiples of the synchronous frequency, i.e., multiples of 60 Hz. Since as discussed earlier the lower electrical resonant frequencies, i.e., under 60 Hz may be the same as a critical mechanical resonant frequency of the turbine generator system, that portion of the speed sensing signal that is the synchronous frequency and below is the portion of the signal that will be indicative of torsional oscillations in the motor generator turbine shaft. Therefore, an ideal filter for the signal conditioning system would be an ideal low-pass filter. A multiple-pole Butterworth filter would approach an ideal low-pass filter but an inherent problem is that the more poles of a filter produce a greater phase shift on signals passing through the filter. Since in order to provide positive damping, the reactor current in the dynamic stabilizer should be 180° out of phase with the generator speed deviation, it can be appreciated that a significant phase shift through the signal conditioning system would be undesirable. It is an important teaching of the invention therefore that a three-pole Butterworth low-pass filter is used for the band-pass filtering in the signal conditioning block diagram even through the three-pole Butterworth does not provide sharp attenuation of the undesirable frequencies. A plot of the frequencies passed through the three-pole Butterworth low-pass filter is shown at 112. It can be seen that there is no sharp attenuation of the signal at the 50 to 70 Hz portion, therefore the signal is passed through the notch filter which is tuned to the turbine generator synchronous frequency to obtain the sharp cutoff at the synchronous frequency. This arrangement approaches an ideal low-pass filter without adding the phase delay inherent in the multiple pole Butterworth filter. A plot of frequencies passed through the notch filter are shown at 114 and the combined frequencies passed through the three-pole Butterworth and the notch filter are shown at 116. All plots are shown with an amplitude or gain of one. The amplitude of the signal is a measurement of the torque on the shaft and is not relevant since amplitude-modulated noise on the signal is virtually eliminated by use of frequency modulation detection of the velocity deviation signal in the signal conditioning system.

In a preferred embodiment of this invention, the first and second phase-locked loop circuit FM demodulators 78 and 82, respectively, are CMOS integrated circuits; the first and second level shifters and the summing amplifier 84, 86 and 88, respectively, are low-noise, low-power, linear operational amplifiers in a single multistage integrated circuit; the three-pole Butterworth filter 90 is a single-stage operational amplifier IC; and the synchronous frequency notch filter 92 is a quad-operational amplifier IC.

Figure 3:
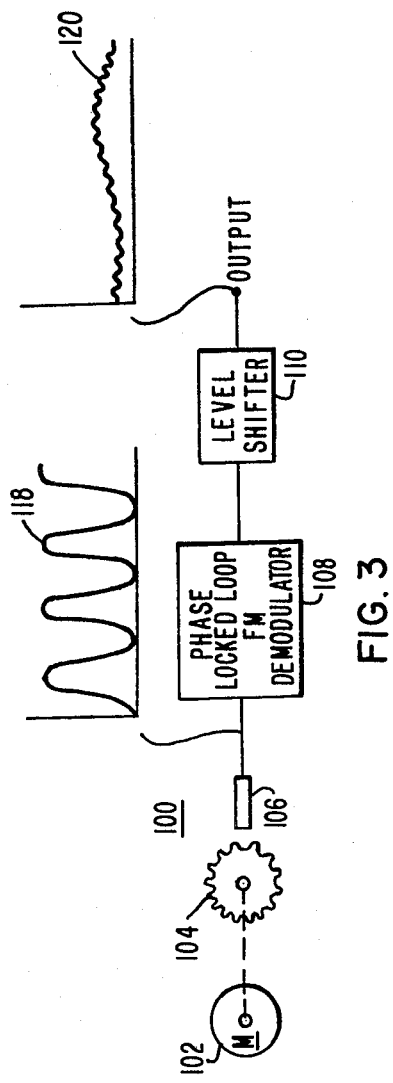
FIG. 3 is a block diagram of an embodiment of the invention that may be used to determine the accuracy of a machined tooth gear.

The teachings of the invention can be applied to a means and method for determining the machining accuracy of the toothed gear wheel 76. Referring now to FIG. 3 there is shown apparatus 100 for determining the machining accuracy of a toothed gear wheel. Apparatus 100 includes a synchronous motor shown generally at 102 on whose shaft a toothed gear wheel 104 whose accuracy is to be determined is mounted. An electromechanical transducer 106 is mounted close to the wheel in a fixed position with respect to the wheel, the output of transducer 106 is fed into a phase-locked loop FM demodulator 108 and level shifter 110. Provided that synchronous motor 102 is driven from a constant frequency source and the transducer is mounted in a fixed position with respect to the wheel, the only variation in multiples of the synchronous frequency of the signal produced by the transducer will be that which is caused by toothed variations on the gear. The output signal from the transducer is plotted at 118. The demodulated signal after passing through the FM demodulator 108 and the level shifter 110 is also plotted at 120. The level shifter is an optional feature that conveniently shifts the output level from the FM demodulator 108 so that the signal is at zero volts for a zero or no speed frequency deviation. The output signal after passing through the level shifter then is an indication that a variation due to an indexing error in tooth center-to-center distances is present on toothed gear wheel 104. Experimental results from a practical embodiment of this system have tested a 120-tooth wheel mounted on a shaft rotating at 3600 RPM which produced a transducer signal frequency of 7200 Hz. Speed deviations as low as 0.0025% were detected in this practical system. This corresponds to one part per 40,000 or a 1 mil (0.001 inch) deviation for a 12¾" diameter wheel. In a preferred embodiment of the invention the phase-locked loop FM demodulator 108 is a CMOS integrated circuit similar to RCA-type CD4046, and the level shifter is a low-noise, low-power linear operational amplifier integrated circuit.

In conclusion what has been disclosed is means and method for reducing velocity deviation signal "noise" from the extracted signal of a speed sensing means that represents the velocity deviation, or oscillatory change in velocity, of the generator-exciter-turbine shaft, which conditioned signal is then used to control a torsional dynamic stabilizer. The amplitude modulated noise on the signal is virtually eliminated by use of frequency modulation detection of the velocity deviation signal. The use of two transducers mounted 180° apart and summing the two FM channels helps to eliminate odd harmonics of the synchronous frequency and FM noise due to wheel eccentricity. The remaining noise sources are reduced by the use of band-pass filtering of the nth FM detected velocity deviation signal. A preferred embodiment of the invention utilizes a three-pole Butterworth low-pass filter in combination with a notch filter tuned to the turbine-generator synchronous frequency. This reduces the unwanted noise to a large degree while providing a minimal phase shift to the sensed velocity signal. Although the present invention has been described with reference to a tooth wheel transducer pickup arrangement for sensing speed because the invention solves certain problems that were relative to this arrangement, it is important to note that the teachings of the invention are not limited to this arrangement. The invention is broadly applicable to any electrical power generating system where it is desired to compensate for torsional oscillation between any of the masses of the generating system. FIG. 3 is an elementary block diagram illustrating the broad applicability of the teachings of the invention, wherein signal conditioning means 110 may be utilized to reduce unwanted noise from the output signal from speed sensing means 112 before it is fed into the compensating means shown generally at 114 of a torsional dynamic stabilizer. The teachings of the invention may also be applied to determining the machining accuracy of a tooth gear wheel as described hereinbefore.

We claim:
1. An electrical power generating system, comprising:
   (a) an alternating current electrical generator which is capable of generating electrical power of generally nominal fixed frequency and generally nominal fixed voltage amplitude at output terminals thereof and supplying said power to a load, said generator having a rotor of predetermined mass;
   (b) energy supply means for driving said rotor to thereby generate said power, said energy supply means having a rotatable portion of predetermined mass;
   (c) resilient shaft means interconnecting said rotor and said energy supply means rotatable portion, the rotational velocity of said shaft means being capable of changing periodically in relation to torsional oscillation in said resilient shaft means thus causing said nominal fixed amplitude of said electrical voltage to be modulated in relation to said periodic change of said shaft velocity;
   (d) speed sensing means disposed in relationship to said shaft means sufficient to measure said rotational velocity of said shaft means and to provide an electrical output signal at an output terminal thereof which signal is indicative of said rotational velocity, said speed sensing means including a toothed wheel rigidly disposed on the shaft and first and second transducers mounted in close proximity to said toothed wheel, said first and second transducers being spaced generally 180° apart in opposing relationship to each other, said output signal from said transducers being fed into a summing amplifier, said summing of said output from said transducers eliminating the noise portion of said output signal from said sensing means due to wheel eccentricity;

(e) compensating means responsive to said output signal from said speed sensing means for compensating for said modulation of said electrical power by said torsional oscillation to thereby generally provide electrical power of said nominal fixed frequency and said nominal fixed voltage amplitude to said load; and (f) signal conditioning means disposed between said speed sensing means and said compensating means for filtering the noise frequencies from the speed sensing signal while passing the frequencies of the speed sensing signals that are indicative of said torsional oscillations to said compensating means, said signal conditioning means includes a phase-locked loop FM demodulator and a level shifter and a high-pass filter in series relationship disposed between the output of each of said first and second transducers and the input of said summing amplifier 2. The electrical power generating system of claim 1 wherein the signal conditioning means includes a multiple-pole Butterworth low-pass filter.

3. The electrical power generating system of claim 2 wherein the signal conditioning means includes a three-pole Butterworth low-pass filter in series with a notch filter tuned to the synchronous frequency of the shaft.

* * * * *